(12) United States Patent
Podaima et al.

(10) Patent No.: US 9,836,410 B2
(45) Date of Patent: Dec. 5, 2017

(54) BURST TRANSLATION LOOK-ASIDE BUFFER

(71) Applicant: QUALCOMM Incorporated, San Diego, CA (US)

(72) Inventors: Jason Edward Podaima, Toronto (CA); Paul Christopher John Wiercienski, Toronto (CA); Alexander Miretsky, Vaughan (CA)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 14/865,965

(22) Filed: Sep. 25, 2015

(65) Prior Publication Data
US 2016/0306746 A1 Oct. 20, 2016

Related U.S. Application Data

(60) Provisional application No. 62/148,121, filed on Apr. 15, 2015.

(51) Int. Cl.
*G06F 12/00* (2006.01)
*G06F 12/1027* (2016.01)
(Continued)

(52) U.S. Cl.
CPC ...... *G06F 12/1027* (2013.01); *G06F 12/1036* (2013.01); *G06F 12/0864* (2013.01);
(Continued)

(58) Field of Classification Search
CPC ............. G06F 12/1027; G06F 12/0864; G06F 12/0895; G06F 2212/1021; G06F 2212/1044; G06F 2212/50
See application file for complete search history.

(56) References Cited

U.S. PATENT DOCUMENTS 5,491,806 A * 2/1996 Horstmann ......... G06F 12/1027
711/207
5,564,052 A * 10/1996 Nguyen .............. G06F 12/0888
365/49.17
(Continued)

FOREIGN PATENT DOCUMENTS

WO 2012015766 A2 2/2012

OTHER PUBLICATIONS

Binh P., et al., "Increasing TLB Reach by Exploiting Clustering in Page Translations", 2014 IEEE 20th International Symposium on High Performance Computer Architecture (HPCA), IEEE, Feb. 15, 2014 (Feb. 15, 2014), pp. 558-567, XP032606749, DOI: 10.1109/HPCA.2014.6835964 [retrieved on Jun. 16, 2014].
(Continued)

*Primary Examiner* — Mark Giardino, Jr.
(74) *Attorney, Agent, or Firm* — Muncy, Geissler, Olds & Lowe

(57) ABSTRACT

A comparand that includes a virtual address is received. Upon determining a match of the comparand to a burst entry tag, a candidate matching translation data unit is selected. The selecting is from a plurality of translation data units associated with the burst entry tag, and is based at least in part on at least one bit of the virtual address. Content of the candidate matching translation data unit is compared to at least a portion of the comparand. Upon a match, a hit is generated.

25 Claims, 11 Drawing Sheets

(51) Int. Cl.
  *G06F 12/1036* (2016.01)
  *G06F 13/00* (2006.01)
  *G06F 13/28* (2006.01)
  *G06F 12/0864* (2016.01)
  *G06F 12/0895* (2016.01)

(52) U.S. Cl.
  CPC .. *G06F 12/0895* (2013.01); *G06F 2212/1021* (2013.01); *G06F 2212/1041* (2013.01); *G06F 2212/1044* (2013.01); *G06F 2212/1048* (2013.01); *G06F 2212/50* (2013.01); *G06F 2212/652* (2013.01); *G06F 2212/654* (2013.01); *G06F 2212/683* (2013.01)

(56) References Cited

U.S. PATENT DOCUMENTS

| | | | | |
|---|---|---|---|---|
| 5,574,877 | A | * | 11/1996 | Dixit ................... G06F 12/1027 711/207 |
| 7,734,892 | B1 | | 6/2010 | Rozas et al. |
| 7,822,926 | B2 | | 10/2010 | Croxford et al. |
| 7,925,859 | B2 | | 4/2011 | Banerjee et al. |
| 8,707,011 | B1 | * | 4/2014 | Glasco ................ G06F 12/1027 711/118 |
| 8,745,356 | B2 | | 6/2014 | Maruyama |
| 2012/0117301 | A1 | | 5/2012 | Wingard |
| 2014/0281116 | A1 | * | 9/2014 | Abdallah ............ G06F 12/1054 711/3 |

OTHER PUBLICATIONS

International Search Report and Written Opinion—PCT/US2016/022435—ISA/EPO—dated May 2, 2016.

Talluri M., et al., "Surpassing the TLB Performance of Superpages with Less Operating System Support", PLDI89, Proceedings of the 2009 ACM SIGPLAN Conference on Programming Language Design and Implementation, Jun. 15-28, 2009, Dublin, Ireland; [SIGPLAN Notices, A Monthly Publication of the Special Interest Group on programming Languages of the AS, vol. 29, No. 11, Nov. 1, 1994 (Nov. 1, 1994). pp. 171-182, XP000491732. ISBN: 978-1-60558-392-1.

* cited by examiner

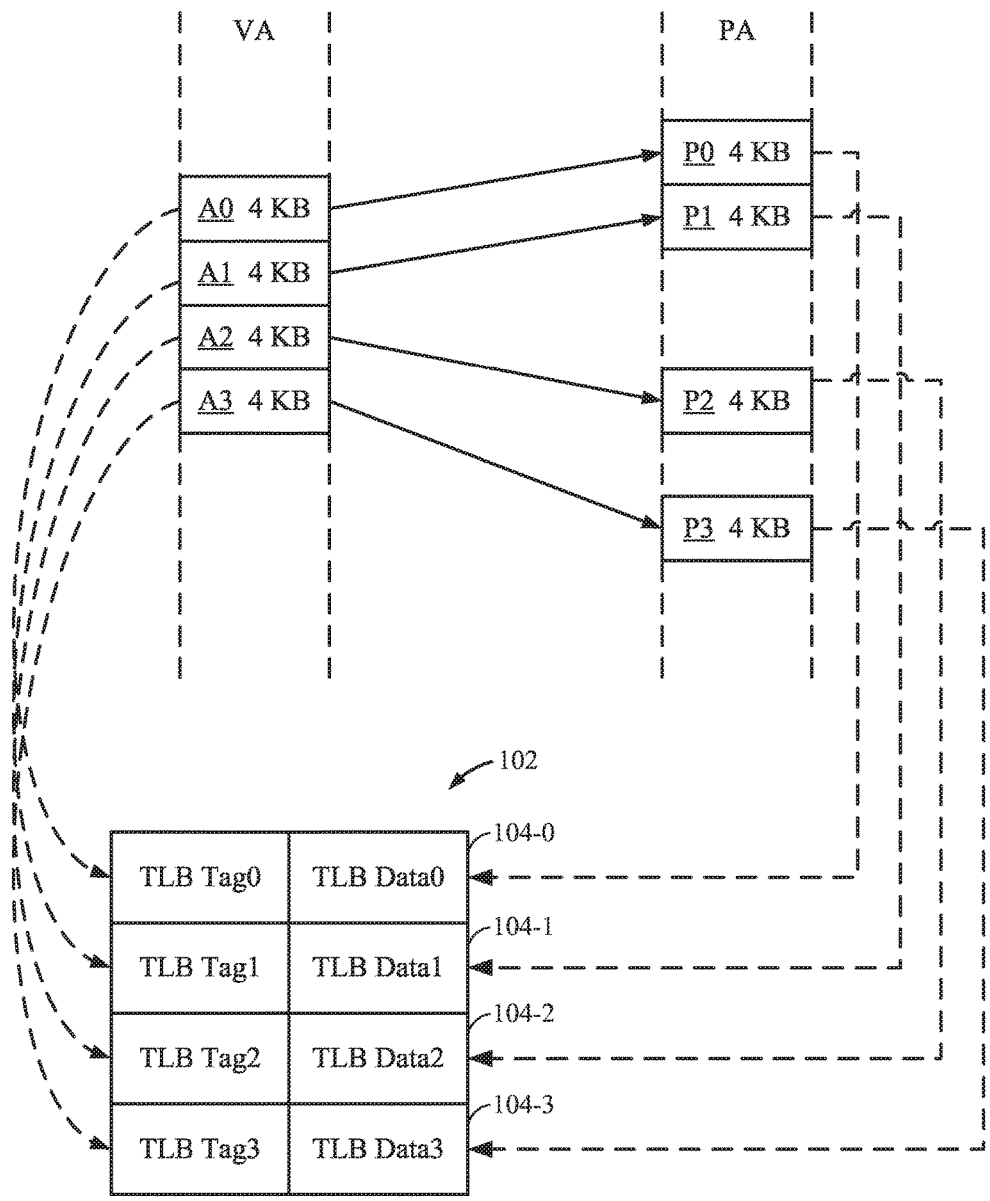
CONVENTIONAL
FIG. 1

BURST TRANSLATION LOOK-ASIDE BUFFER

CLAIM OF PRIORITY UNDER 35 U.S.C. §119

The present Application for Patent claims priority to Provisional Application No. 62/148,121 entitled BURST TRANSLATION LOOK-ASIDE BUFFER, filed Apr. 15, 2015, and assigned to the assignee hereof and hereby expressly incorporated by reference herein.

FIELD OF DISCLOSURE

The present application is generally related to memory management.

BACKGROUND

A processor can access memory by first generating a "virtual address" instead of the actual physical address of the target location in memory. To access the target location, the virtual address can be mapped to the physical addresses. The virtual address to physical address ("VA-to-PA") mapping can be stored in a cache, and may be dynamically updated under control, for example, of an operating system. Virtual addressing can provide various benefits, for example, dynamic allocation of physical memory space, protection against unauthorized access of secure memory space, and prevention of multiple programs inadvertently using overlapping space in physical memory. Virtual addressing can also, for example, enable non-contiguous physical memory spaces to appear to a software program as a contiguous space.

Conventional virtual addressing techniques can segment physical memory into blocks or "pages," which may be identified by "page numbers." The VA-to-PA mapping provides a relationship between a virtual page number and a physical page number, and mapping information is stored in entries of the "page table". The page tables can be searched by a "page table walk" process, using a sub-set of bits (e.g., "VA tag bits") of the virtual address. However, there will be processing overhead if a page table walk is required for each memory access. A cache holding a selection of the page entries (e.g., entries most recently used) is one conventional technique for reducing page table walks. The cache, often called a "translation lookaside buffer" or "TLB," can have N entries. Each TLB entry may include a "tag" that holds "tag bits" which can be searched using the VA tag bits, and can include a physical address, e.g., the physical page number to which the VA tag bits map. When the CPU generates a virtual address, the TLB uses the VA tag bits to search the tag bits in the N entries. If there is a match, the TLB identifies a hit and outputs the physical page number from the matching entry. If there is no match, the TLB identifies a "miss" and a memory management resource can perform a "page table walk" search of the page tables. As mentioned above, the page table walk can consume processing time and memory management resources. Accordingly, low miss rate can be a TLB performance goal.

Other performance goals for a TLB can include fast search speed, e.g., within a clock cycle, and fast TLB invalidation.

However, the different TLB performance goals can create conflicting design goals when applying conventional TLB design techniques. For example, increasing the TLB size, i.e., increasing the number of entries that can be concurrently stored, is one conventional TLB design technique to lower miss rate. Increased TLB size may lead to increased costs, and reduced performance due to a corresponding increase in TLB circuit area and search circuit complexity, and a concomitant increase of propagation delays.

There are other conventional techniques that aim to lower TLB miss rate. For example, one conventional technique uses a "set associative" TLB architecture, which can enable efficient use of chip area. However, set associative TLB architecture can also exhibit a large number of TLB conflicts, and both search and TLB invalidation can consume multiple cycles.

SUMMARY

This Summary identifies example features and aspects thereof, and is not an exclusive or exhaustive description of the disclosed subject matter. Whether features or aspects are included in, or omitted from this Summary is not intended as indicative of relative importance of such features. Additional features and aspects are described, and will become apparent to persons skilled in the art upon reading the following detailed description and viewing the drawings that form a part thereof.

As will be appreciated upon reading this disclose, features can include, but are not limited to, a burst-TLB that can provide improved area efficiency, and scalability, while retaining the qualities of a fully-associative TLBs having fast TLB lookup, and fast TLB invalidation properties.

Methods are disclosed for translating a virtual address, and in one exemplary method, example operations can include, according to various aspects, receiving a comparand, wherein the comparand can include a virtual address and, upon determining a match of the comparand to a burst entry tag, selecting a candidate matching translation data unit, the selecting being from a plurality of translation data units, the plurality of data translation units being associated with the burst entry tag, and the selecting being based at least in part on at least one bit of the virtual address. Example operations, according to various aspects, can also include comparing a content of the candidate matching translation data unit to at least a portion of the comparand and, upon a result of the comparing indicating a match, generating a hit.

Apparatuses are disclosed that can provide a translation lookaside buffer (TLB), and in one exemplary TLB features can include burst TLB entry selection logic, configured to receive a comparand and, in response, to determine whether the comparand and a burst entry tag are a match, wherein the comparand can include a virtual address. TLB features can further include, according to various aspects, a column selector logic, which can be configured to select, in response to the burst TLB entry selection logic determining that the comparand and the burst entry tag are a match, a candidate matching translation data unit, wherein the candidate matching translation data unit is among a plurality of translation data units associated with the burst entry tag, and can be further configured to select the candidate matching translation data unit based at least in part on at least one bit of the virtual address. TLB features, according to various aspects, can further include match logic, wherein the match logic can be configured to compare a content of the candidate matching translation data unit to at least a portion of the comparand and, upon a result of the comparing indicating a match, generate a hit.

Examples of a non-transitory computer readable medium according to various aspects can comprise code, which, when read and executed by a processor, can cause the processor to receive a comparand, wherein the comparand can include a virtual address, and to determine whether the comparand and a burst entry tag are a match, and upon determining that the comparand and the burst entry tag are a match, select a candidate matching translation data unit, wherein the candidate matching translation data unit is a translation data unit among a plurality of translation data units associated with the burst entry tag, and to select the candidate matching translation data unit based, at least in part, on at least one bit of the virtual address. In an aspect, non-transitory computer readable medium according to various aspects can further comprise code which, when read and executed by the processor, can cause the processor to compare a content of the candidate matching translation data unit to at least a portion of the comparand and, upon a result of the comparing indicating a match, to generate a hit.

Example apparatuses according to one or more aspects can provide a translation lookaside buffer (TLB), and features can include means for receiving a comparand, wherein the comparand includes a virtual address, and means for determining whether the comparand and the burst entry tag are a match, and upon determining that the comparand and the burst entry tag are a match, electing a candidate matching translation data unit. According to one or more aspects, features can further include means for comparing a content of the candidate matching translation data unit to at least a portion of the comparand and, upon a result of the comparing indicating a match, for generating a hit, wherein the candidate matching translation data unit can be a translation data unit among a plurality of translation data units, and wherein selecting the candidate matching translation data unit can be based, at least in part, on at least one bit of the virtual address.

BRIEF DESCRIPTION OF THE DRAWINGS

The accompanying drawings are presented to aid in the description of aspects and are provided solely for illustration and are not any limitation thereof.

FIG. 1 illustrates a configuration and logical operation of a related art translation-lookaside-buffer (TLB).

DETAILED DESCRIPTION

Figure 2:
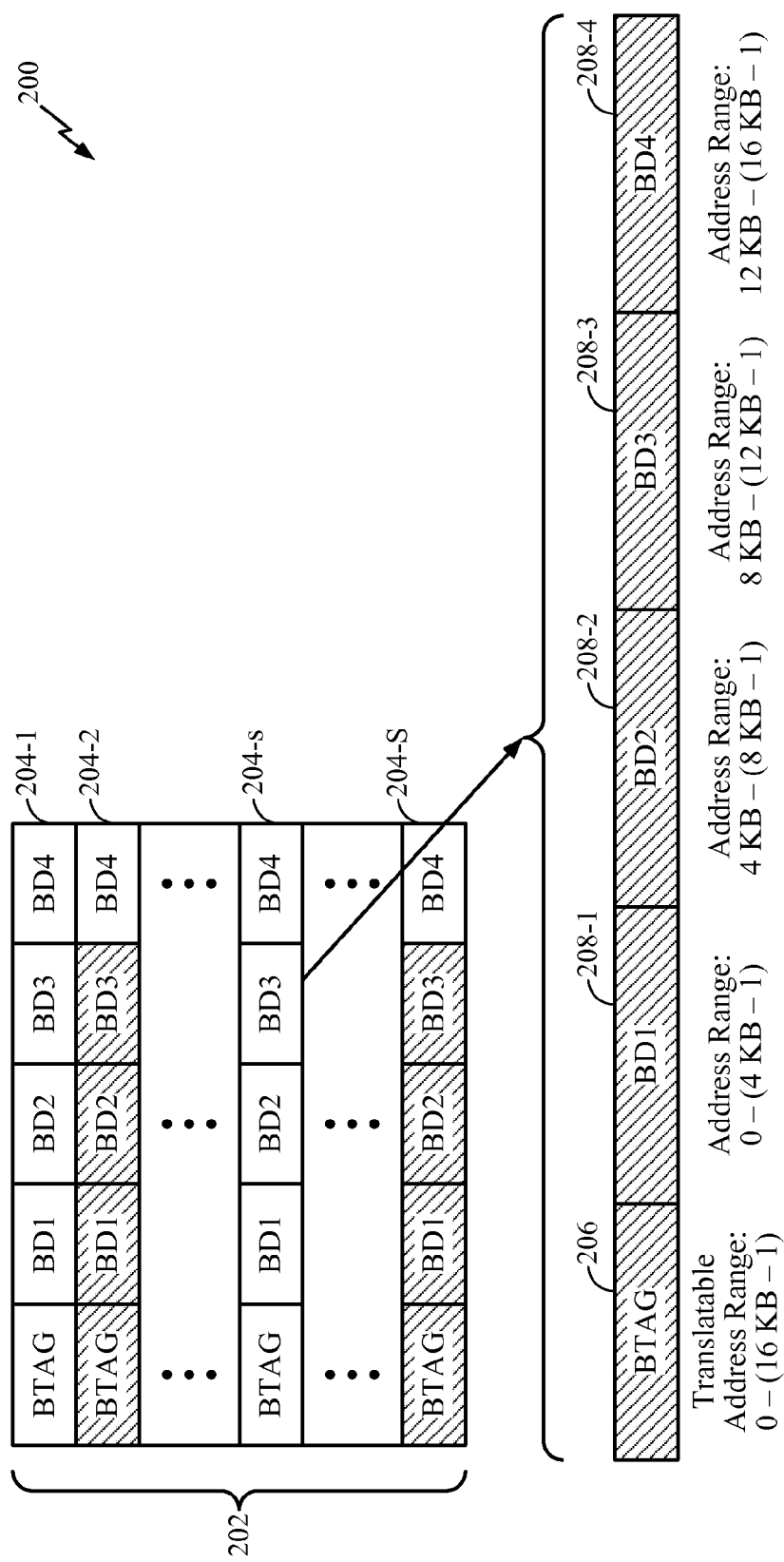
FIG. 2 illustrates one arrangement in one exemplary burst entry TLB, and one example burst entry, according to aspects of this disclosure.

Aspects are disclosed in the following description and related drawings directed to specific exemplary aspects. Alternate aspects may be devised without departing from the scope of the disclosed concepts. In certain described example implementations, instances are identified where various component structures and portions of operations can be taken from known, conventional techniques, and then arranged in accordance with one or more aspects. In such instances, internal details of the known, conventional component structures and/or portions of operations are omitted to help avoid potential obfuscation of disclosed concepts.

The terminology used herein is only for the purpose of describing examples showing particular aspects and is not intended as limiting.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all practices include the discussed feature, advantage or mode of operation.

As used herein, the singular forms "a", "an" and "the" are intended to include the plural forms as well, unless the context clearly indicates otherwise. It will be understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Certain aspects are described in terms of operations and steps, for example, in or relating to various processes. It will be understood that except in instances where explicitly stated otherwise, or where made clear from a particular context, that the described order of such operations and steps is only for purposes of example, and is not necessarily limiting of the order of operations or steps that may be applied in practices according to various exemplary aspects.

In addition, operations in various processes are described in reference to flow diagrams. It will be understood that the flow diagrams do not necessarily mean that operations shown by one block terminate, or cannot continue upon commencement of operations shown by another block.

Certain aspects are described in terms of example operations, steps, actions and sequences of operations, steps and actions that can performed by or under control of, for example, a computing device or elements of a computing device. It will be understood by persons of ordinary skill, upon reading this disclosure, that such operations, steps, actions, sequences and combinations thereof can be performed by, or under control of specific circuits (e.g., application specific integrated circuits (ASICs)), by program instructions being executed by one or more processors, or a combination of both.

Accordingly, it will be appreciated by such persons that operations, steps, actions, sequences and other combinations thereof can be embodied entirely within any form of computer readable storage medium having stored therein a corresponding set of computer instructions that, upon execution, can cause an associated processor to perform, directly or indirectly, operations, steps, actions, sequences and other combinations described herein. Thus, the various aspects may be embodied in a number of different forms, all of which are contemplated to be within the scope of the claimed subject matter.

FIG. 1 shows a logical configuration, and example operations of a conventional translation-lookaside-buffer (TLB) 102. The conventional TLB 102 is shown storing four conventional TLB entries 104-0, 104-1, 104-2 and 104-3, which will be collectively referred to as "conventional TLB entries 104" (a label not appearing separately on FIG. 1). The quantity of four conventional TLB entries 104 is an arbitrary example. Each of the four conventional TLB entries 104 includes a TLB tag and a TLB mapping data.

The TLB tags of the four conventional TLB entries 104 are labeled, respectively, as TLB Tag0, TLB Tag1, TLB Tag2 and TLB Tag3 and, for convenience, will be collectively referenced as "TLB TagsX" (a label not appearing separately on FIG. 1). The TLB mapping data of the conventional TLB entries 104 are labeled, respectively, as TLB Data0, TLB Data1, TLB Data2 and TLB Data3, and will be collectively referenced as "TLB DataX" (a label not appearing separately on FIG. 1).

In accordance with conventional techniques known to skilled persons, each of the TLB TagsX can identify a virtual address block for which the TLB DataX may be valid translation data. In the FIG. 1 example, TLB Tag0 matches virtual address block A0, TLB Tag1 matches virtual address block A1 and, in like manner, TLB Tag2 and TLB Tag3 match virtual address blocks A2 and A3, respectively. The virtual address blocks A0, A1, A2 and A3 will be collectively referenced as "virtual address blocks AX" (a label not appearing separately on FIG. 1). Each of the virtual address blocks AX has a size (in terms of contiguous virtual addresses), in the FIG. 1 example, of 4 kilobytes (KB) shown in FIG. 1. The size can be referred to as the "granule size."

Referring to FIG. 1, the conventional TLB 102 can provide rapid translation of a virtual address, but only if the virtual address is in a virtual address block AX holding a valid conventional TLB entry 104. The probability of the virtual address being in a virtual address block AX, i.e., the probability of a TLB "hit" depends, at least in part, on the number of valid conventional TLB entries 104. In various applications, though, achieving desired probability of TLB hits at a given granule size may lead to the number of entries being large. As described earlier in this disclosure, designing a conventional TLB cache capable of holding a large number of conventional TLB entries can incur costs, for example chip area and propagation delays.

Methods and systems are disclosed that include a TLB cache that can provide, among other features, a rapidly searchable set of S single TLB entries, each holding the VA-to-PA mapping for multiple virtual address blocks. For convenience, description herein of examples of TLB cache methods, systems and processes according to disclosed aspects will use, not exclusively, the labels of "burst TLB cache" and "burst TLB entry." It will be understood that "burst TLB cache" and "burst TLB entry" are coined labels that have no inherent meaning and do not limit the scope of any disclosed aspect.

In one burst TLB cache according to one or more aspects, each burst TLB entry can include a TLB tag and a set of M particularly configured TLB fields. The TLB tag will be alternatively referenced as a "burst TLB tag." The particularly configured TLB fields will be alternatively referenced, collectively, as "translation data units" and, generically, as "a translation data unit." It will be understood that "translation data unit(s)" and "burst TLB tag" are coined labels that have no inherent meaning and do not limit the scope of any disclosed aspect.

In an aspect, each of the M translation data units of the burst TLB entry can hold information for VA-to-PA translation of a different one of M virtual address blocks. Accordingly, each burst TLB entry can hold VA-to-PA mapping information for M virtual address blocks. Conventional TLBs, in comparison, would require M TLB entries for the M virtual address blocks.

In an aspect, the burst TLB tag can include information identifying the total virtual address range for which the M translation data units hold, collectively, VA-to-PA mapping information.

In one aspect, each of the M translation data units can include a translation data validity flag. The translation data validity flag can be, for example, a bit. In an aspect, the translation data validity flag can be switchable between a translation data valid flag and a translation data invalid flag. The burst TLB tag of each burst TLB entry can, in an aspect, include a burst entry validity flag. In aspect, the burst entry validity flag can be switchable between a burst entry valid flag, e.g., logical "0" or "1," and a burst entry invalid flag, e.g., logical "1" or "0." In one aspect, the burst entry valid flag may be generated as a logical OR of the M translation data unit valid flags. In another aspect, the burst entry valid flag may be set, selectively, independent of the translation data unit valid flags.

In an aspect, each burst TLB entry data may contain, in addition to features described herein, conventional types and kinds of translation information. Examples include memory page attributes, cacheability/sharability, and access permissions. These and other conventional types and kinds of translation table information are known to skilled persons and, therefore, further detailed description is omitted.

In one example burst TLB according to one or more aspects, M may be, for example, two. Assuming an M of two, each burst TLB entry in one example burst TLB may comprise a first translation data unit, a second translation data unit and a burst entry tag. In an aspect, the burst entry valid flag for this example can be generated as a logical OR of the respective translation data validity flags of the first TLB translation data unit and the second TLB translation data unit. M equal to two is an arbitrary example, only for illustration. For example, without limitation, M may be equal to four, or greater than four FIG. 2 illustrates an arrangement 200 including one burst entry TLB 202 according to various aspects. The burst entry TLB 202 may hold a quantity S of burst TLB entries, such as the examples individually labeled 204-1, 204-2 . . . 204-s . . . 204-S. For purposes of description, the burst TLB entries 201-1, 204-2 . . . 204-S will be alternatively referenced, collectively, as "burst TLB entries 204" (a label not separately visible on FIG. 2). Also for purposes of description, shown by the enlarged view of an arbitrary one of the burst TLB entries 204, each can comprise a burst TLB tag 206 and, assuming an M of four, a first translation data unit 208-1, a second translation data unit 208-2, a third translation data unit 208-3, and a fourth translation data unit 208-4. The first translation data unit 208-1, second translation data unit 208-2, third translation data unit 208-3, and fourth translation data unit 208-4 will be collectively referenced as "translation data units 208" (a label not separately visible in FIG. 2).

For purposes of example, a granule size of 4 KB will be assumed, meaning that each of the translation data units 208 can hold VA-to-PA mapping of a block of 4 KB VA addresses. The translation data units 208 will be assumed, for purposes of example, to hold VA-to-PA mapping of four contiguous VA blocks. Further to the example, a content of the first translation data unit 208-1, labeled on FIG. 2 as "BD1," can be information for VA-to-PA mapping of VA "0" to VA "4 KB−1," where VA "0" can be an arbitrary virtual address used as a "zero" address, to which the other VAs are offsets, for purposes of description. A content of second translation data unit 208-2, labeled on FIG. 2 as "BD2," may be information for VA-to-PA mapping of VA "4 KB" to "8 KB−1." A content of the third translation data unit 208-3, labeled on FIG. 2 as "BD3," can be information for VA-to-PA mapping of VA "8 KB" to "12 KB−1." Lastly, a content of fourth translation data unit 208-4, labeled on FIG. 2 as "BD4," can be information for VA-to-PA mapping for VA "12 KB" to "16 KB−1." The burst TLB tag 206 can include information identifying the VA range spanned by the four translation data units 208, which, for the example ranges and example 4 KB granularity described above, will be VA "0" through VA (16K-1). It will be understood that, as used in this disclosure, the labels "BTAG," "BD1," "BD2," "BD3" and "BD4" have no intrinsic meaning, and do not limit the scope of any of the disclosed aspects.

Figure 3:
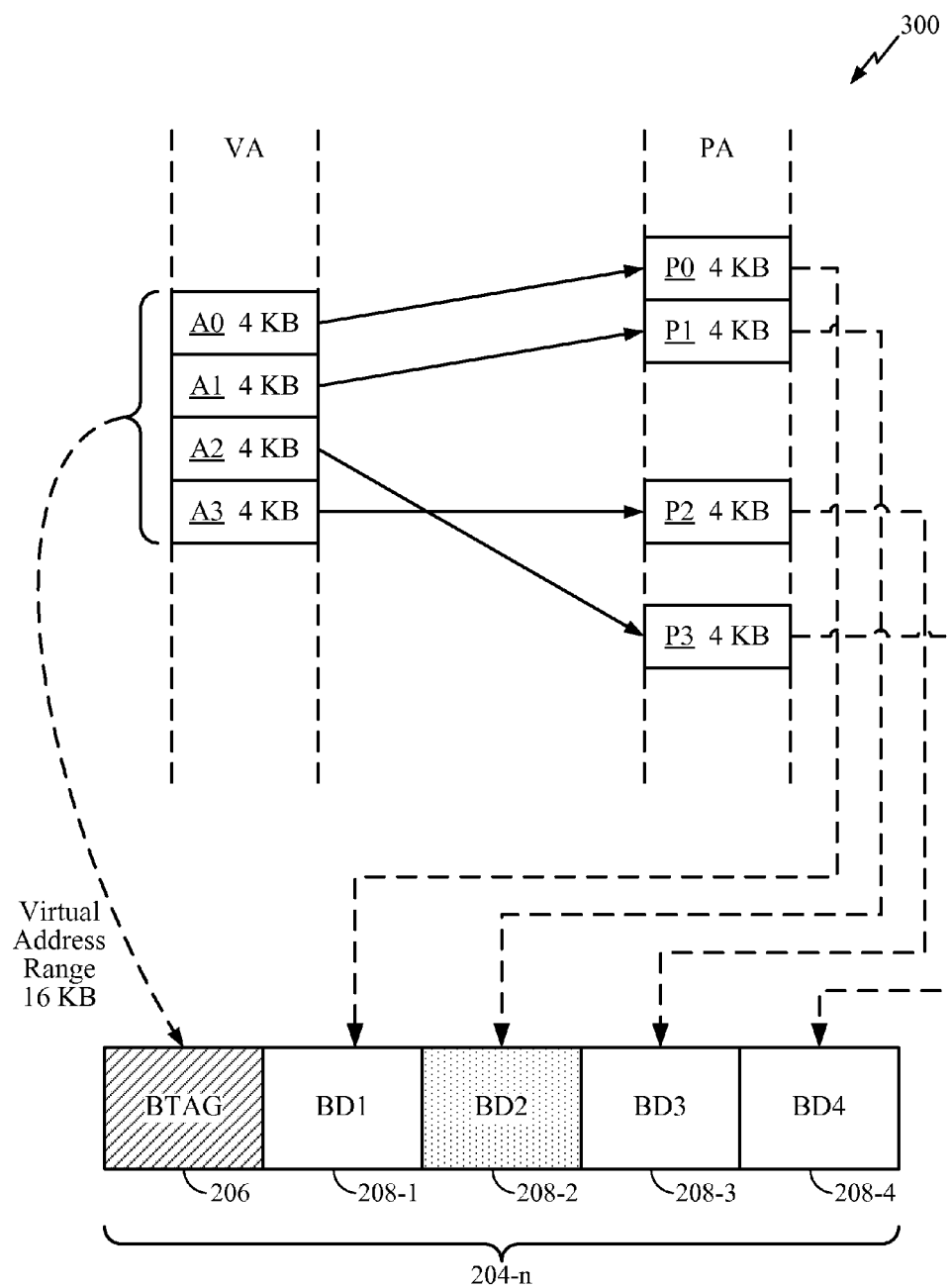
FIG. 3 illustrates a logical flow in one exemplary burst entry TLB with one example burst entry, according to aspects of this disclosure.

FIG. 3 shows an example VA-to-PA mapping 300 that can be provided by the arbitrary burst entry TLB 204-s, as described above in reference to FIG. 2. Referring to FIG. 3, the four translation data units 208 can map four contiguous VA blocks of 4 KB VA, labeled "A0," "A1," A2," and "A3," to a corresponding four PA blocks, labeled "P0," "P1," P2," and "P3," each 4 KB. As shown, the four PA blocks are not necessarily contiguous, and are not necessarily ordered (in terms of location) as the VA blocks A0, A1, A2, and A3. Referring to FIG. 3, the BD1 content of the first translation data unit 208-1 can be information mapping the VA address block A0 (0 to 4 KB−1) to the 4 KB PA block P0. The BD2 content of the second translation data unit 208-2 can be information mapping the VA address block A1 (4 KB to 8 KB−1) to the 4 KB PA block P1. The BD3 content of the third translation data unit 208-3 can be information mapping the VA address block A2 (8 KB to 12 KB−1) to the 4 KB PA block P2, and the BD4 content of the fourth translation data unit 208-4 can be information mapping the VA address block A3 (12 KB to 16 KB−1) to the 4 KB PA block P3.

Figure 4:
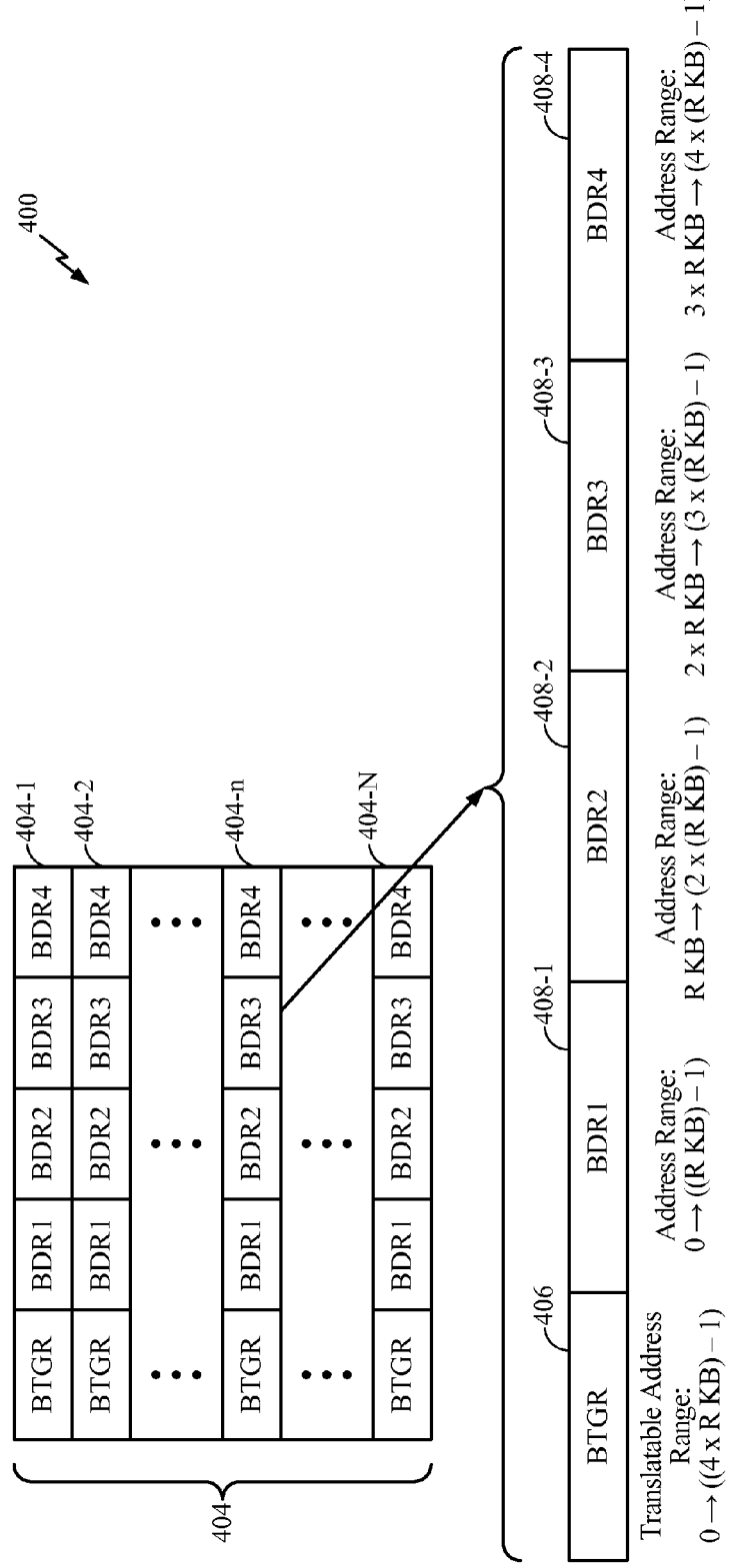
FIG. 4 illustrates one arrangement in another exemplary burst entry TLB, and one example alternative burst entry, according to aspects of this disclosure.

FIG. 4 illustrates one arrangement 400 in one burst entry TLB according to aspects of this disclosure, having a granule size of R KB. The FIG. 4 arrangement 400 is shown, for convenience, as a variation of the FIG. 2 arrangement 200. In the arrangement 400, content of the first translation data unit 208-1, labeled "BDR1 on FIG. 4, may be information for VA-to-PA translation of virtual addresses ranging from virtual address (VA) "0" to VA "R KB−1." Content of the second translation data unit 208-2, labeled "BDR2 on FIG. 4, may be information for VA-to-PA translation of VA "R KB" to "2R KB−1." Content of the third translation data unit 208-3 and content of the fourth translation data unit, labeled "BDR3" "BDR4," respectively, can be information for VA-to-PA mapping of VA "2R KB" to "3R KB−1" and VA "3R KB" to "4R KB−1". In an aspect, content of the burst TLB tag 206, labeled "BTGR" on FIG. 4, can include burst TLB entry address range information (not visible in FIG. 4). The burst TLB entry address range information can indicate that the collective content, namely, BDR1, BDR2, BDR3 and BDR4, of the four translation data units 208 in each TLB entry 204-s, comprises VA-to-PA mapping information for the range of virtual addresses of VA "0" to VA "4R KB−1." It will be understood that, as used in this disclosure, the labels "BTGR," "BDR1," "BDR2," "BDR3" and "BDR4" have no intrinsic meaning, and do not limit the scope of any of the disclosed aspects.

Referring to FIGS. 2 and 4, the respective arrangements 200 and 400 were described with M equal to four, i.e., having four translation data units 208. Each of the burst TLB entries 204, in both the arrangements 200 and 400, could therefore hold information for translating four virtual address blocks.

Figure 5:
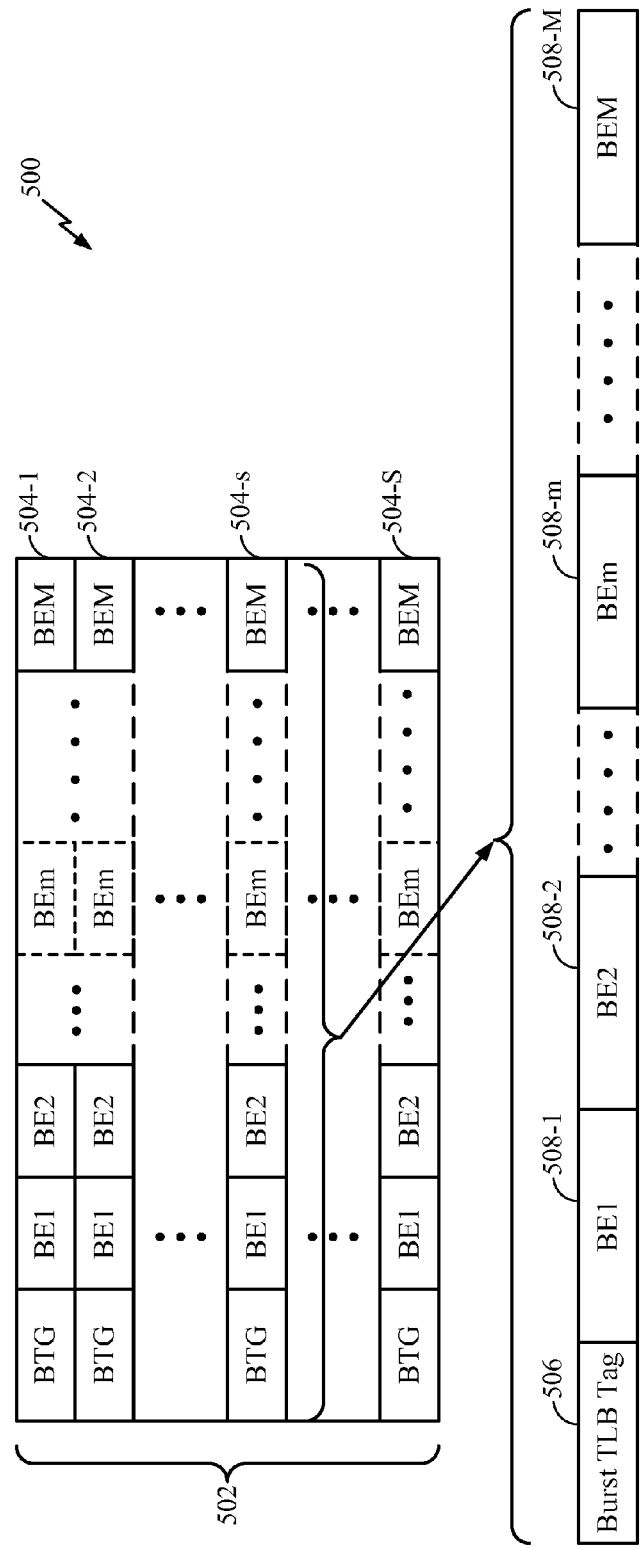
FIG. 5 illustrates one arrangement in another exemplary burst entry TLB, and one example alternative burst entry, according to aspects of this disclosure.

FIG. 5 shows one example generic arrangement 500, having exemplary burst entry TLB 502, holding a quantity T of burst TLB entries, individually labeled 504-1, 504-2 . . . 504-S. For purposes of description, burst TLB entries 504-1, 504-2 . . . 504-$t$ . . . 504-T will be alternatively referenced, collectively, as "burst TLB entries 504" (a label not separately visible on FIG. 5). Configuration of the burst TLB entries 504 can be generally according to the configuration of the burst TLB entries 204, as described above, with each burst TLB entry 504 holding the generic quantity M of translation data unit, as oppose to the specific quantity four. As previously described, M can be any integer power of two.

The enlarged view of the burst TLB entry 504-$t$, which can be representative of all of the burst TLB entries 504, shows it comprises a burst TLB tag 506, a first translation data unit 508=1, second translation data unit 508-2 . . . $m^{th}$ translation data unit 508=m . . . and $M^{th}$ translation data unit 508=M (collectively "translation data units 508 (a label not separately visible in FIG. 5)). The respective content of the translation data unit 508 is labeled "BEL" "BE2," . . . . "BEm . . . "BEM." The content of the burst TLB tag 506 is labeled "BTG." It will be understood that the labels "BTG," "BE1," "BE2" . . . "BEm" . . . "BEM" have no intrinsic meaning, and do not limit the scope of any of the disclosed aspects.

Assuming a particular granularity, for example but not limited to 4 KB, the content BTG of the burst TLB tag 506 of each burst TLB entry 504 can indicate a range of virtual addresses that spans M times that granularity, e.g., M times 4 KB. A larger quantity M can provide smaller granularity, or can provide each of the burst TLB entries 504 holding, collectively by its M translation data units 508, information for VA-to-PA mapping of a larger range of virtual addresses. As will be further understood upon reading description in greater detail, later in this disclosure, of logic for searching and selecting the burst TLB entries, and for selecting among the translation data units 508, larger quantities M can have costs, for example, of chip area and propagation delay.

Figure 6:
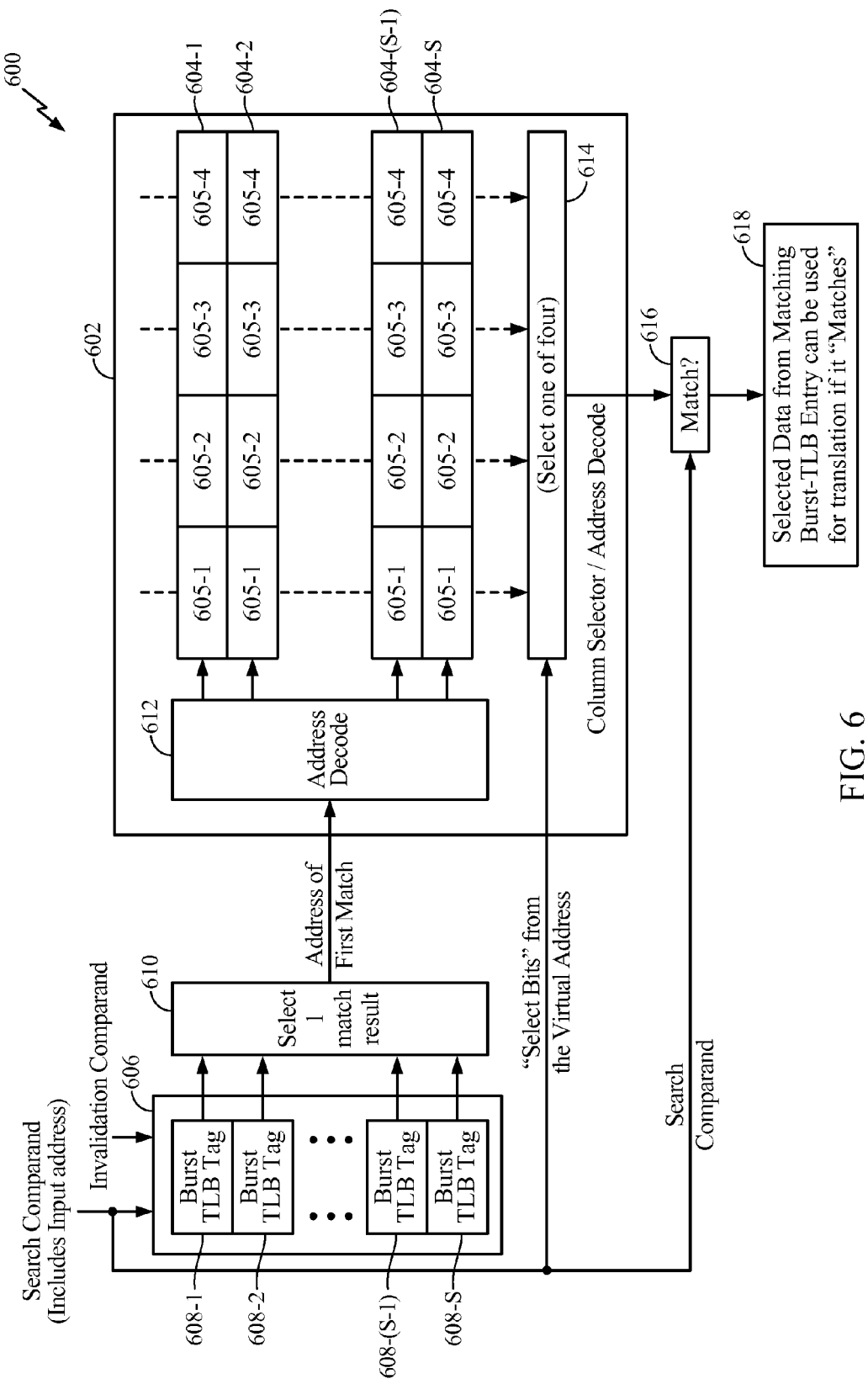
FIG. 6 illustrates one configuration of burst decode and match functions in one exemplary burst entry TLB holding an example set of burst entries, according to aspects of this disclosure.

FIG. 6 illustrates features of a burst TLB 600 according to one or more aspects. The TLB 600, according to an aspect, may include a burst TLB data set buffer 602. The TLB data set buffer 602 can hold a set of burst TLB data sets comprising, for example, first burst TLB data set 604-1, second burst TLB data set 604-2 . . . and $S^{th}$ burst TLB data set 604-S, which for purposes of description will be alternatively referenced, collectively, as "burst TLB data sets 604" (not appearing as a separate label in FIG. 6). Each of the burst TLB data sets 604 can be generally configured as the four translation data units 208 of each of the burst TLB entries 204 described in reference to FIG. 2. Accordingly, each of the burst TLB data sets 604 can include M translation data units, M being an integer power of 2 as described above. For this example M is assumed as four. The four translation data units comprise first translation data unit 605-1, second translation data unit 605-2, third translation data unit 605-3 and fourth translation data unit 605-4, collectively referenced as "translation data unit 605," (not appearing as a separate label in FIG. 6). The translation data units 605 may be configured, generally, according to the translation data units 208 and 508 described previously in this disclosure. In an aspect, each of the four translation data units 605 can include a translation data validity flag, as identified previously in this disclosure.

Referring to FIG. 6, a burst TLB tag buffer 606 can hold, associated with each burst TLB data set 604, a burst TLB tag, for example, first burst TLB tag 608-1, second burst TLB tag 608-2 . . . and S$^{th}$ burst TLB tag 608-S, which for purposes of description will be alternatively referenced, collectively, as "burst TLB tags 608" (not appearing as a separate label in FIG. 6). The first burst TLB tag 608-1 and the first burst TLB data set 604-1, in combination, can form a first burst TLB entry (not separately labeled in FIG. 6) which, in turn, can function as the first burst TLB entry 204-1 described in reference to FIG. 2. Likewise, the second burst TLB tag 608-2 and second burst TLB data set 604-2, in combination, form a second burst TLB entry (not separately labeled in FIG. 6) which, in turn, can function as the second burst TLB entry 204-2 described in reference to FIG. 2. In an aspect, the burst TLB tags 608 can each include a burst TLB entry validity flag (not explicitly visible in FIG. 6), such as described previously in this disclosure.

Referring to FIG. 6, the burst TLB 600 may include a burst TLB entry selection logic 610. The burst TLB entry selection logic 610 may be configured such that, upon receiving a virtual address and, optionally, associated other information (e.g., context information), it can form a step one search comparand, and compare that step one search comparand to each of the burst TLB tags 608. The step one search comparand can be, for example, the above-described "VA tag bits," which are designated bits of the received virtual address. In an aspect, a "match" may be established by a concurrence of two conditions, which can comprise: a) the VA tag bits falling within (matching) the address range held in at least one of the burst TLB tags 608; and b) at least one of the TLB entry(ies) corresponding to the matching burst TLB tags 608 being valid. The latter condition can be determined from the burst entry validity flag described earlier in this disclosure.

Referring to FIG. 6, in an aspect, the burst TLB entry selection logic 610 may be configured to communicate the respective addresses associated with the one or more matching burst TLB tags 608 to an address decoder 612. The burst TLB data sets 604 may be arranged as rows and, accordingly, the address decoder 612 can be configured as a row decoder. Configured as such, upon receiving each address from the burst TLB entry selection logic 610 the address decoder 612 may select a burst TLB data set 604 as a row. The row will include M translation data units, and in the FIG. 6 example M is equal to four.

In an aspect, a column select/row decoder 614 may be configured to receive bits from the virtual address, termed "select bits" and, based on the select bits, to select one of the four (or other plurality for M other than four) translation data units 605 as a candidate matching translation data unit. The selection can be based on designated bits of the virtual address, and will be alternatively referenced as "selection bits." The number of selection bits, in an aspect, can be log base 2 of M. Accordingly, if M is two, one selection bit is required and, if M is four, two selection bits are required. In an aspect, the burst TLB 600 can include a match logic 616, which can be configured to compare information stored in the candidate matching translation data unit to the step one search comparand used by the burst TLB entry selection logic 610, or predetermined portions of the same. As illustration, assume an example burst TLB (600) that receives 18-bit virtual addresses. The search comparand in this example would consist of the most significant six bits of the virtual address (virtual address address bits [15:12]). Assume arbitrary bit values for this example search comparand to be "001010." Also assume that second burst TLB tag 608-2 matches this example comparand of "001010." Operations of the TLB 600 for this example can include the burst TLB entry selection logic 610 selecting, using "001010," the second burst entry TLB tag 608-2. The selecting is based on comparand bits "001010" matching a second burst TLB tag 608-2 address range value that contains virtual address associated with the search comparand. The address decoder 612, using information from the second burst TLB tag 608-2 can select the second burst TLB data set 604-2 and provide that second burst TLB data set 604-2 to the column select/row decoder 614. The column select/row decoder 614 can then, using the select bits from the virtual address, which comprise two bits for this example (M being four), select one of the four translation data units 605 of the second burst TLB translation data set. In operations according to one or aspects, if the selected translation data unit 605 is valid, and related to an address range which contains the virtual address associated with the search comparand, the match logic 616 will, at least in part, identify a match. Functionalities represented by block 618 can then apply operations of a VA-to-PA translation of the virtual address, using translation information stored in the selected translation data unit. If the match logic 616 detects no match, a TLB miss can be reported.

Referring to FIG. 6, in an aspect, the above-described operations of the burst TLB entry selection logic 610 searching the burst TLB tag buffer 606 for a burst entry TLB tag 608 that matches the comparand can be termed, for purposes of description, a "step one search." The above-described operations of the column select/row decoder 614 and match logic 616 can be termed a "step two search." The portion of the comparand (e.g., the assigned bits of the virtual address) used for the step one search can be termed a "step one search comparand." The portion of the comparand (e.g., the assigned bits of the virtual address) used for the step one search can be termed a "step two search comparand." It will be understood that forming the step one search comparand can be implemented, in whole or in part, external to the burst TLB 600.

In an aspect, operations of the comparing the step one search comparand to the burst TLB tags 608 may produce a match with multiple burst TLB tags 608. In a further aspect, the burst TLB entry selection logic 610 may be configured such that, in the event of the multiple match, a sequential step one search retrieves a first of the matching burst TLB tags 608. The sequence of the step one search can be according to rules. The rules can be application-specific and can be identified and implemented, for various applications, by persons of ordinary skill upon reading this disclosure, without undue experimentation. Further detailed description of the rules is therefore omitted.

Referring to FIG. 6, in an aspect, the burst entry address range previously described as included in each of the burst TLB tags 608 (and in each of the "BTAGs" described in reference to FIGS. 2 and 4) can be a burst entry primary address range (not explicitly visible in FIG. 6). In an aspect, each of the burst TLB tags 608 can also include a burst entry secondary address range (not explicitly visible in FIG. 6). The burst entry secondary address range can be employed, in one or more aspects, to select among the burst TLB tags for purposes other than finding VA-to-PA translation information. One purpose can be addressable selective invalidation of burst TLB tags, such as the burst TLB tags 608.

In an aspect, the burst TLB 600 may be configured to provide selective invalidation of its burst TLB tags 608. Referring to FIG. 6, in another aspect, a comparand such as the depicted Invalidation Comparand can be presented to the burst TLB tag buffer 606. The Invalidation Comparand can include an invalidation address (not visible in FIG. 6) set to fall within the burst entry secondary address range of a particular burst TLB tag 608. The burst entry secondary address range of all the burst TLB tags 608 can then be compared to the Invalidation Comparand. Upon a burst TLB tag 608 having a burst entry secondary address range matching the Invalidation Comparand, that burst TLB tag 608 can be"invalidated." The invalidation may comprise, for example, switching its burst TLB entry validity flag to the burst TLB entry invalid flag. The Invalidation Comparand may include additional information, for example, context and/or address space identifiers. Such information can include information used in conventional TLB techniques. In an aspect, the invalidation process may include comparing such information to corresponding information in the burst TLB tags 608, in addition to the above-described comparing to the burst entry secondary address range.

Figure 7:
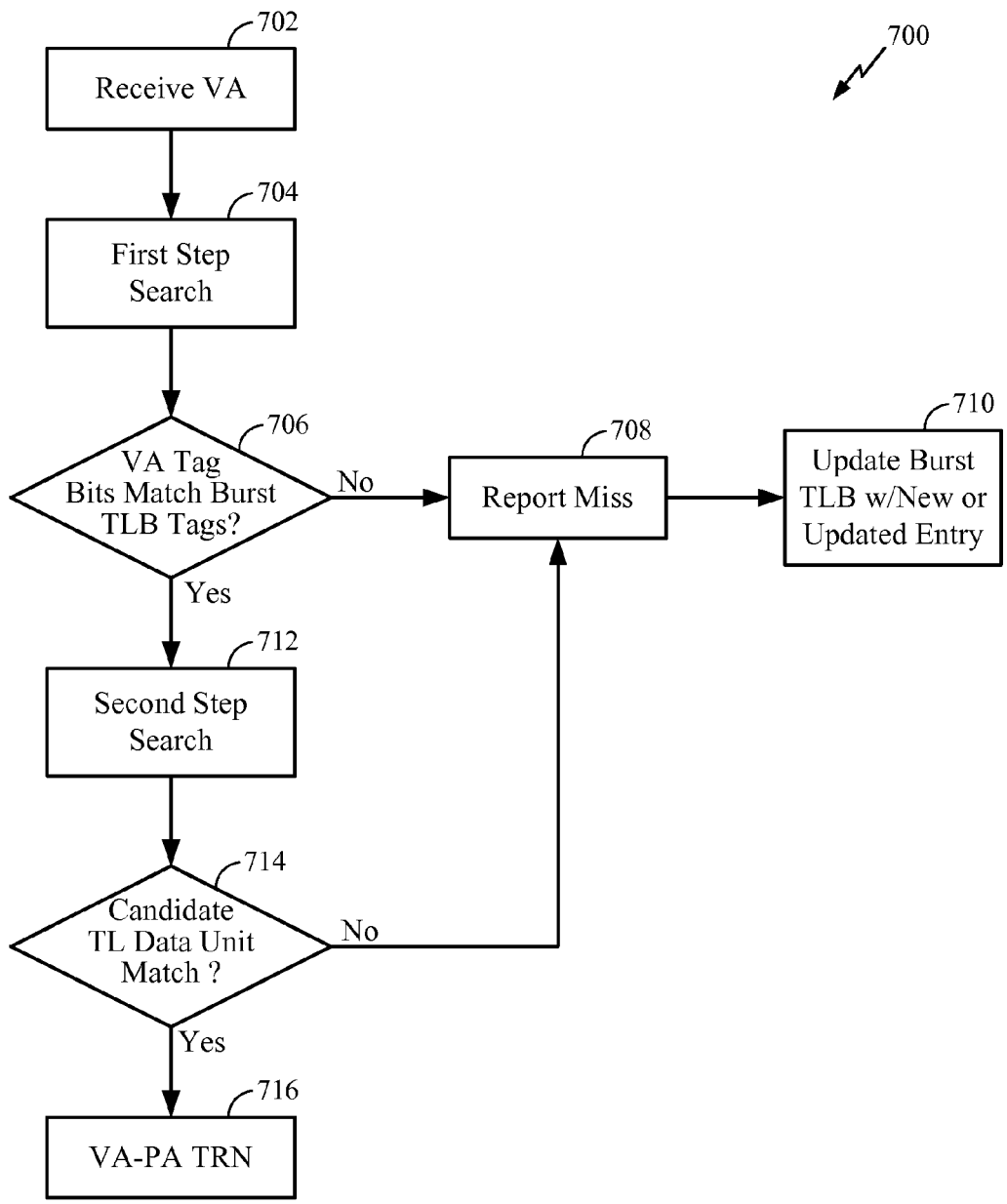
FIG. 7 shows a flow diagram of example operations in one burst entry TLB process according to various aspects.

FIG. 7 shows a flow diagram 700 of example operations in one burst entry TLB process according to various aspects. In describing examples in reference to FIG. 7, the term "flow 700" will be understood to mean an example process comprising operations according to the flow diagram 700. In an aspect, the flow 700 can start at 702 with operations of receiving a virtual address. The flow 700 can, in response, proceed to 704 and apply operations of a first step search, for example, as described in reference to FIG. 6. Operations at 704 may include, for example, the FIG. 6 match logic 616 comparing designated tag bits of the virtual address, or "VA tag bits" to the burst TLB tags 608 to determine if there is a "match." As shown by the "No" branch exiting decision block 706, of the operations at 704 of the first step search find no match, the flow 700 can proceed to 708, report a "miss," and then proceed to 710 an apply operations of creation of a new burst TLB entry, and in updating the burst TLB with that created TLB burst entry. Examples of such operations are described in further detail later in this disclosure.

Referring to FIG. 7, if the operations at 704 find one or more of the burst TLB tags (e.g., one or more of the burst TLB tags 608) to match the VA tag bits, the flow 700, as indicated by the "Yes" branch exiting decision block 706, can proceed to 712 and apply operations of a second step search on the corresponding burst TLB data sets. For example, referring to FIG. 6, operations at 712 can perform the second step search on the burst TLB data sets 604 corresponding to the matching burst TLB tags 608. Operations at 712 of the second step search can include selecting, using the selection bits described above, one of the M translation data units as a candidate matching translation data unit, and comparing the content of the candidate matching translation data unit to the step one comparand. The comparing operations at 712 can be performed, for example, by the match logic 616 of the burst TLB 600. If there is a match then, as shown by the "Yes" branch exiting decision block 714, the flow 700 can proceed to 716 and perform a VA-to-PA translation of the virtual address. The VA-to-PA operations at 716 can be performed, for example, by the, functionalities described above for block 618 of the burst TLB 600.

Referring to FIG. 7, if the comparing operations at 712 show the candidate matching translation data unit does not match the step one comparand then, as shown by the "No" branch exiting decision block 714, the flow decision can proceed to 708, report a "miss," then proceed to 710 and apply operations of creation of a new burst TLB entry. In an aspect, the creation of a new burst entry can leave the burst TLB data set 604 associated with the candidate matching translation data unit unchanged, and create a corresponding new burst TLB data set 604. In another aspect, the burst TLB data set 604 associated with the candidate matching translation data unit may be invalidated, for example, by switching its burst TLB entry validity flag to the burst TLB entry invalid flag. Referring to FIG. 7 block 710 and to FIG. 6, in an aspect, the burst TLB 600 may be configured to update individual TLB translation data units, without updating all M (e.g., four). In an aspect, such updating individual TLB translation data units can be performed in response to a step one search that yields one or more matching burst TLB tags 608, but no match is found by the step two search—comparing the step one search comparand and the content of the candidate matching translation data unit. The individual TLB translation data unit updating can be performed, in an aspect, by writing or overwriting new information in one or more of the translation data units and, for each, and setting the corresponding valid bit as valid.

Figure 8:
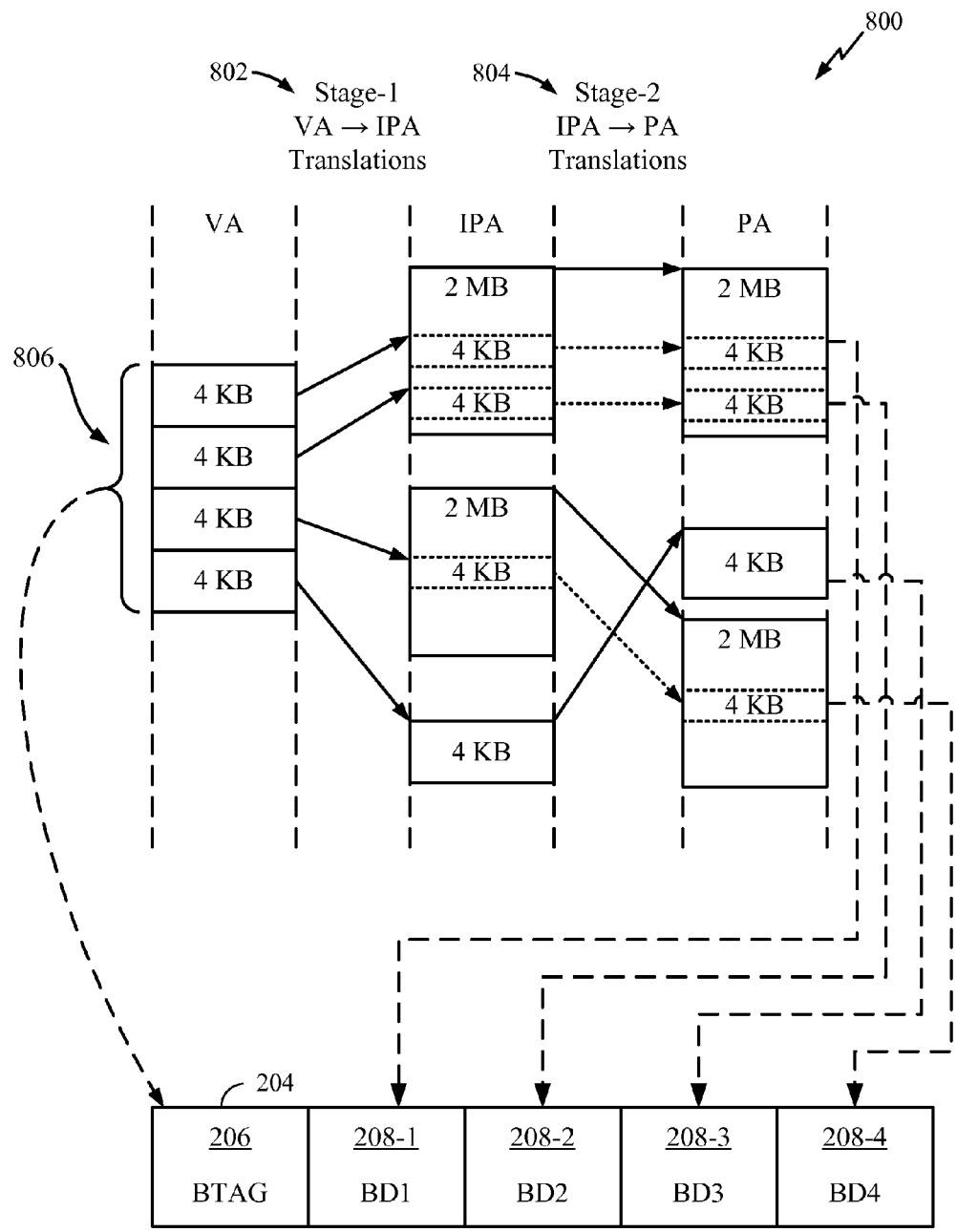
FIG. 8 shows a high level mapping diagram, having a first stage mapping, and a second stage mapping for a burst entry TLB according to aspects of this disclosure.

FIG. 8 shows a high level mapping diagram 800 of a portion of a two-stage translation, comprising a first stage translation 802, from the VA space to an Intermediate Physical Address (IPA) space, and a second stage translation 804 from the IPA space to the PA space. For purposes of illustration, the first stage translation 802 may be, for example, and without limitation, according to "Stage 1 translation" employed by the memory management unit of ARM® "Cortex A" series and various comparable processor types. The second stage translation 804 may be, for example, and without limitation, according to the "Stage 2 translation" employed, by the memory management unit of ARM® "Cortex A" series and various comparable processor types. General concepts, operations of two-stage translation such as represented by the high level mapping diagram 800 are known to persons of skill and, therefore, further detail description of such concepts and operations is omitted. Referring to FIGS. 2 and 8, for purpose of illustration an example VA range of the first stage translation 802 can be the VA range 806, which for the FIG. 2 example is 16 KB, corresponding to the 16 KB range of the "burst TLB entries 204. The 16 KB range is spanned, as described in reference to FIG. 2, by the four translation data units 208 of the burst TLB entries 204. As will be described in greater detail in reference to FIG. 9, the two-stage translation shown by FIG. 8 can be associated, in various aspects, to the creating or updating of a burst TLB entry 204.

Figure 9:
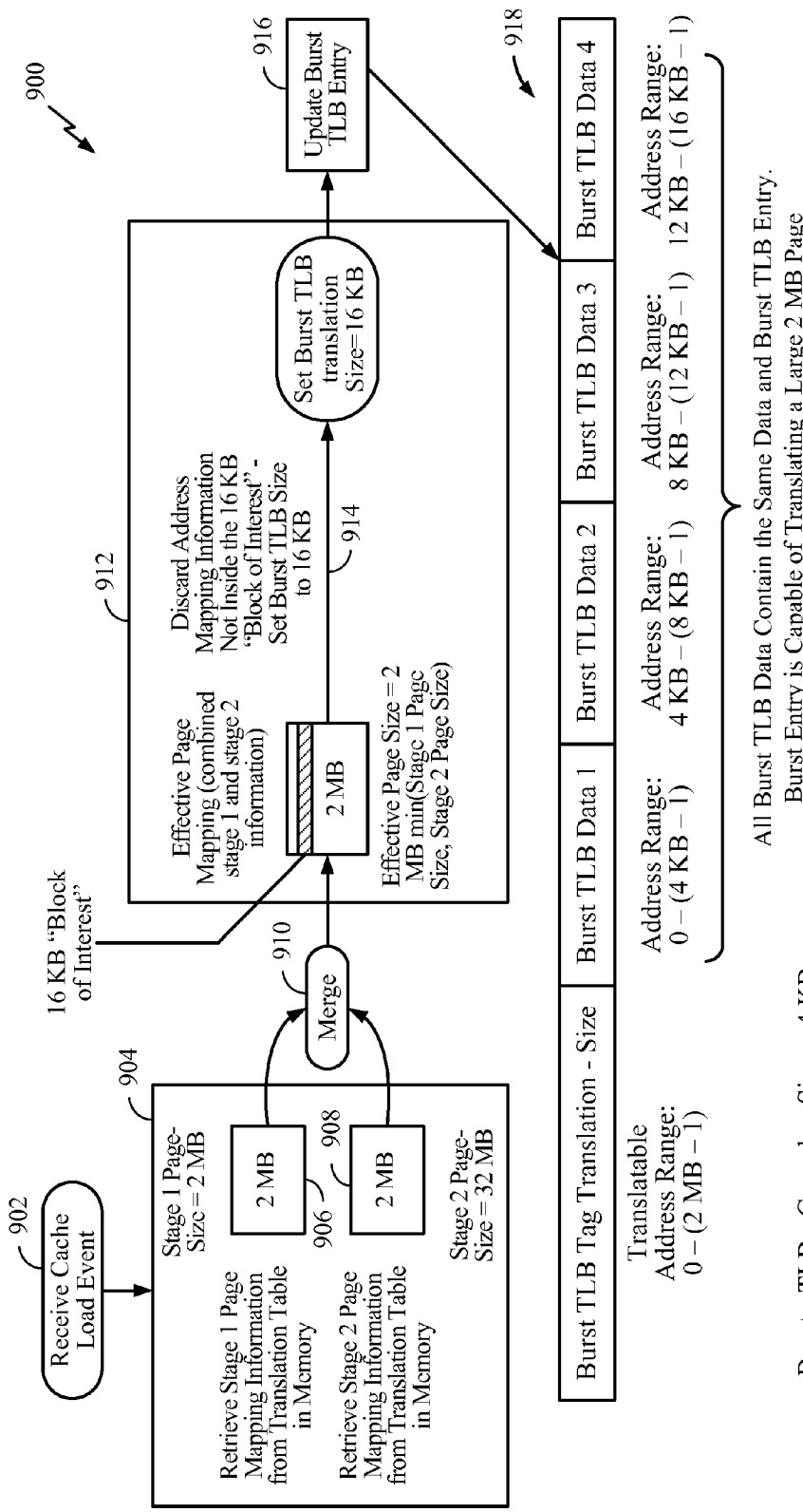
FIG. 9 illustrates a logical flow in one example generation of a burst entry in a burst entry TLB, according to aspects of this disclosure.

FIG. 9 shows a flow diagram 900 of example operations in one process for generating and loading a burst entry in a burst entry TLB, according to aspects of this disclosure. In describing operations in reference to FIG. 9, the term "flow 900" will be understood to mean an example process comprising operations according to the flow diagram 900. The flow 900 assumes selecting a target/victim burst TLB entry to overwrite. In an aspect, operations of selecting the target/victim burst TLB entry to overwrite, for purposes of the flow 900 can be an adaption of known, conventional techniques for selecting a target/victim of a known, conventional TLB, e.g., "replacement," readily performed by persons of skill upon reading this disclosure, without undue experimentation. Further detailed description of selecting the target/victim burst TLB entry to overwrite is therefore omitted.

Operations according to the flow 900 can begin at 902 upon detecting or receiving an indication of a cache load event. The cache load event at 902 can be, for example, a FIG. 7 step one miss, shown by the "No" branch exiting decision block 706 to 708. The cache load event detected or received at 902 can, for example, be a step two miss, shown by the "No" branch exiting decision block 714 to 708. In an aspect, the cache load event at 902 can be an occurrence of receiving a direct command (not explicitly visible in the figures), for example, provided by an application program (not explicitly visible in the figures) to pre-load the burst-TLB with a specified burst-TLB entry. These are only example events that can be detected or received at 902 to initiate generation and loading of a new burst-TLB entry.

Upon the cache load event being detected or received at 902, the flow 900 can proceed to 904 and apply operations for retrieving a page of Stage-1 mapping information 906 and a page of Stage-2 mapping information 908. Referring to FIGS. 8 and 9, the Stage-1 page 906 can correspond to the first stage translation 802 of VA-to-IPA, and for this example has the FIG. 8 example size of 2 MB as opposed to the FIG. 8 example size of 4 KB. In similar manner, the Stage-2 page 908 can correspond to the second stage translation 804 of IPA-to-PA, having the FIG. 8 example size of 2 MB, as opposed to the FIG. 8 example size of 4 KB. The flow 900 can then proceed to 910 and apply operations of merging the Stage-1 page 906 and the Stage-2 page 908.

Referring to FIG. 9, after operations at 910 the flow 900 can proceed to 912 and apply operations of setting a "block of interest" translation range, and then proceed to 914 and apply operations of discarding translation information outside of the "block of interest." Referring to FIGS. 2, 8 and 9 one example block of interest can be the 16 KB virtual address space described in reference to the FIG. 2 burst TLB entry 204-*s*. This can correspond, for example, to the 16 KB range of virtual address space 806 shown on FIG. 8. The translation information outside of the "block of interest" discarded at 914 can correspond, referring to FIG. 8, to Stage 1 mapping translation information to IPA addresses not within the four IPA blocks of 4 KB each (shown on FIG. 8 but not separately numbered), and not within the four PA blocks of 4 KB each (shown on FIG. 8 but not separately numbered), After operations at 914, the flow 900 can then proceed to 916 and apply operations of updating the burst TLB with a new (or updated) "block of interest" burst TLB entry 918. Operations at 916 can also include invalidating the victim/target "block-of-interest" burst-TLB entry prior to being overwritten or updated.

Figure 10:
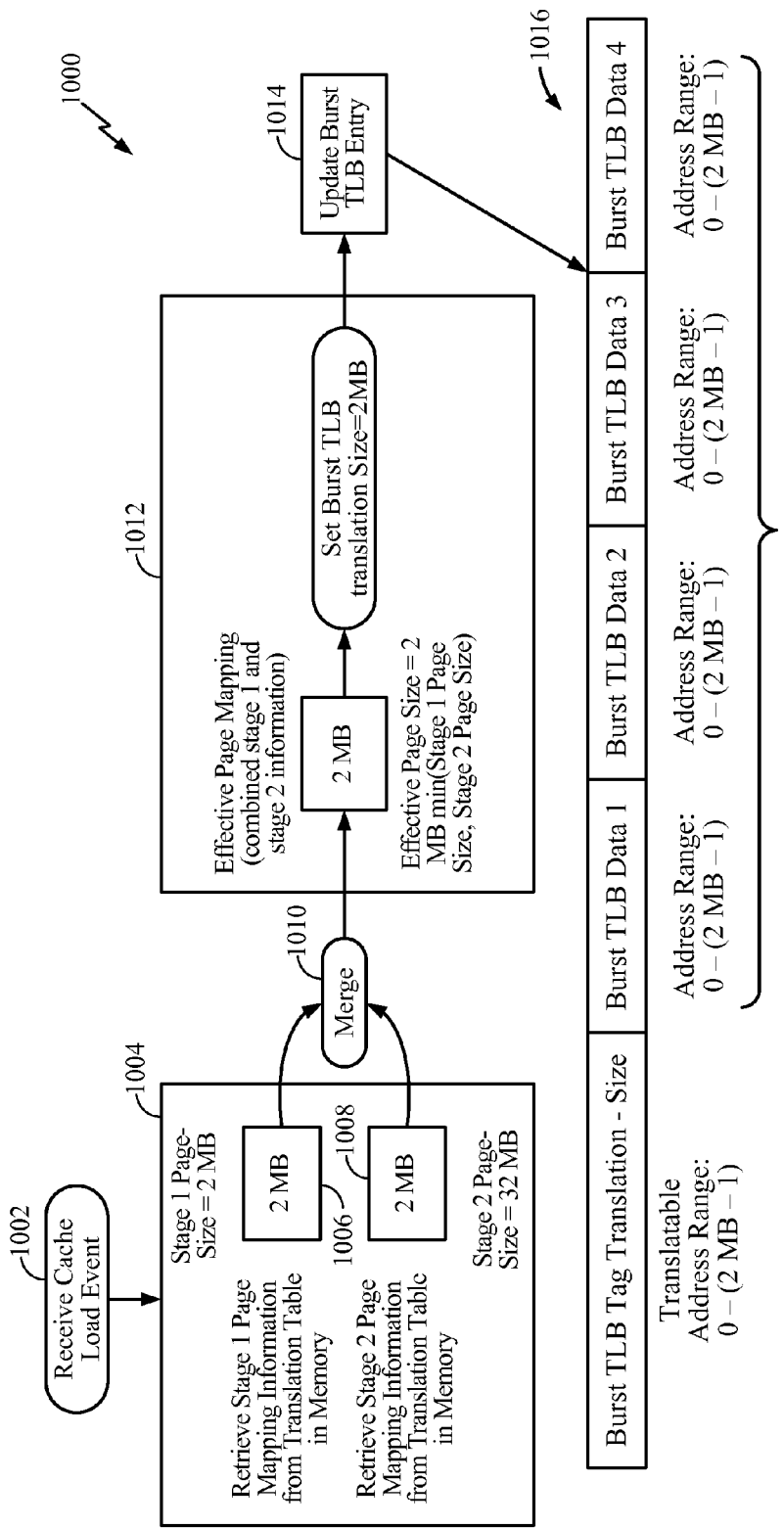
FIG. 10 illustrates a logical flow in one example alternative generation of a burst entry in a burst entry TLB, according to aspects of this disclosure.

FIG. 10 shows a flow diagram 1000 of example operations in one alternative process for generating and loading a burst entry in a burst entry TLB, according to another aspect. In describing examples in reference to FIG. 1000, the term "flow 1000" will be understood to mean an example process comprising operations according to the flow diagram 1000. It will be understood, as described above in reference to the FIG. 9 flow 900, that the FIG. 10 loading the burst entry in the burst entry TLB can include selecting a target/victim burst TLB entry to overwrite. As also described above, such operations can be an adaption of known, conventional techniques for selecting a target/victim of a known, conventional TLB, e.g., "replacement" and, therefore, further detailed description is omitted.

Referring to FIG. 10, the flow 1000 can begin at 1002 by detecting or receiving a cache load event. The cache load event can be, for example, any of the example cache load event described above, in reference to the FIG. 9 block 902. Upon the cache load event at 1002, the flow 1000 can proceed to 1004 and apply operations for retrieving a Stage-1 page 1006 and a Stage-2 page 1008. The information can be retrieved, for example, from translation tables (not explicitly visible in the figures) in a main memory, example of which are described in greater detail in reference to FIG. 11. After operations at 1004, the flow 1000 can proceed to 1010 and apply operations of merging the Stage-1 page 1006 and the Stage-2 page 1008. The flow 1000 can then proceed to 1012 and apply operations of setting the translation size (i.e., the address range encoded in the primary address range burst entry tags (e.g., FIG. 6 burst TLB tags 608)). In an aspect, operations at 1012 can set the translation size as the largest among the effective page size, and the burst TLB granule size. The effective page size, referring to FIG. 10, can be the minimum from among the Stage-1 page size and the Stage-2 page size, which in this example is 2 Mbyte. The burst TLB granule size, referring to FIG. 2, can be the 4 KB burst TLB granule size of the FIG. 2 translation data units 208. In a more general example, the burst TLB granule size utilized for operations at 1010 can be the R KB burst TLB granule size of the FIG. 4 burst TLB data units 408. Operations at 1012 of setting the translation size can be represented, for example, as:

Set translation size (encoded in the primary address range of the burst-TLB tags) to $$\max(\text{Effective Page size}, 2^Q \times \text{Burst-TLB-granule-size}) \quad \text{(Eq. 1)},$$

where Q=Log base 2 of M.

The translation size is therefore, according to Equation 1, the largest among the effective page size, and M times the burst TLB granule size.

In an aspect, operations at 1010 can also include setting an invalidation size (encoded in the secondary address range of the burst-TLB tags). The invalidation size can be represented, for example, as $$\max(\text{Invalidation Page size}, 2^Q \times \text{Burst-TLB-granule-size}) \quad \text{(Eq. 2)},$$

where Invalidation Page size is the Stage-1 page size (906).

The invalidation size is therefore, according to Equation 2, the largest among the Stage-1 page size 1006 and M times the burst TLB granule size.

Upon operations at 1012 setting the translation size, the flow 1000 can proceed to 1014 and apply operations of updating the burst TLB with a new (or updated) burst TLB entry 1016 with the corresponding VA-to-PA mapping information. Operations at 1014 can include, in association with the over-writing or updating as described above, invalidating the victim/target burst-TLB entry prior to being overwritten or updated. Operations for invalidating the victim/target burst-TLB entry can comprise, for example changing the valid flag of the burst-TLB entry from valid to invalid.

It can be understood by persons of skill, upon reading this disclosure in its entirety, that operations 1014 and the new (or updated) burst TLB entry 1016 can depend, at least in part, on a relative size of the effective page size and the quantity of M times the burst TLB granule size. For example, if the effective page size is greater than M (or $2^Q$) times the burst TLB granule size, operations at 1014 can set the same translation data in all M of the translation data units. In an aspect, the operations at 1014 can also set the data valid flag for each the M translation data units to "valid." The FIG. 10 new (or updated) burst TLB entry 1016 is shown as an example according to this aspect, as all four of the example burst TLB data (labeled "Burst TLB Data 1, Burst TLB Data 2 . . . Burst TLB Data 4) hold the same information for translating the range (in this example) of "0"

to (2 MB−1). Regarding the "0" address, it can be an arbitrary address used as a reference for purposes of description. Alternatively, also if the effective page size is greater than M (or $2^Q$) times the burst TLB granule size, the operations at 1014 can store translation in a specific, fixed Burst-TLB data location, and set this Burst-TLB data location valid flag to valid.

Referring to FIG. 10, in an aspect, if the effective page size is less than or equal to $2^Q$ (i.e., the integer M)×Burst-TLB-granule-size, the operations at 1014 can populate the burst-TLB data that correspond to the effective page-size and set those burst-TLB data flags to valid.

Figure 11:
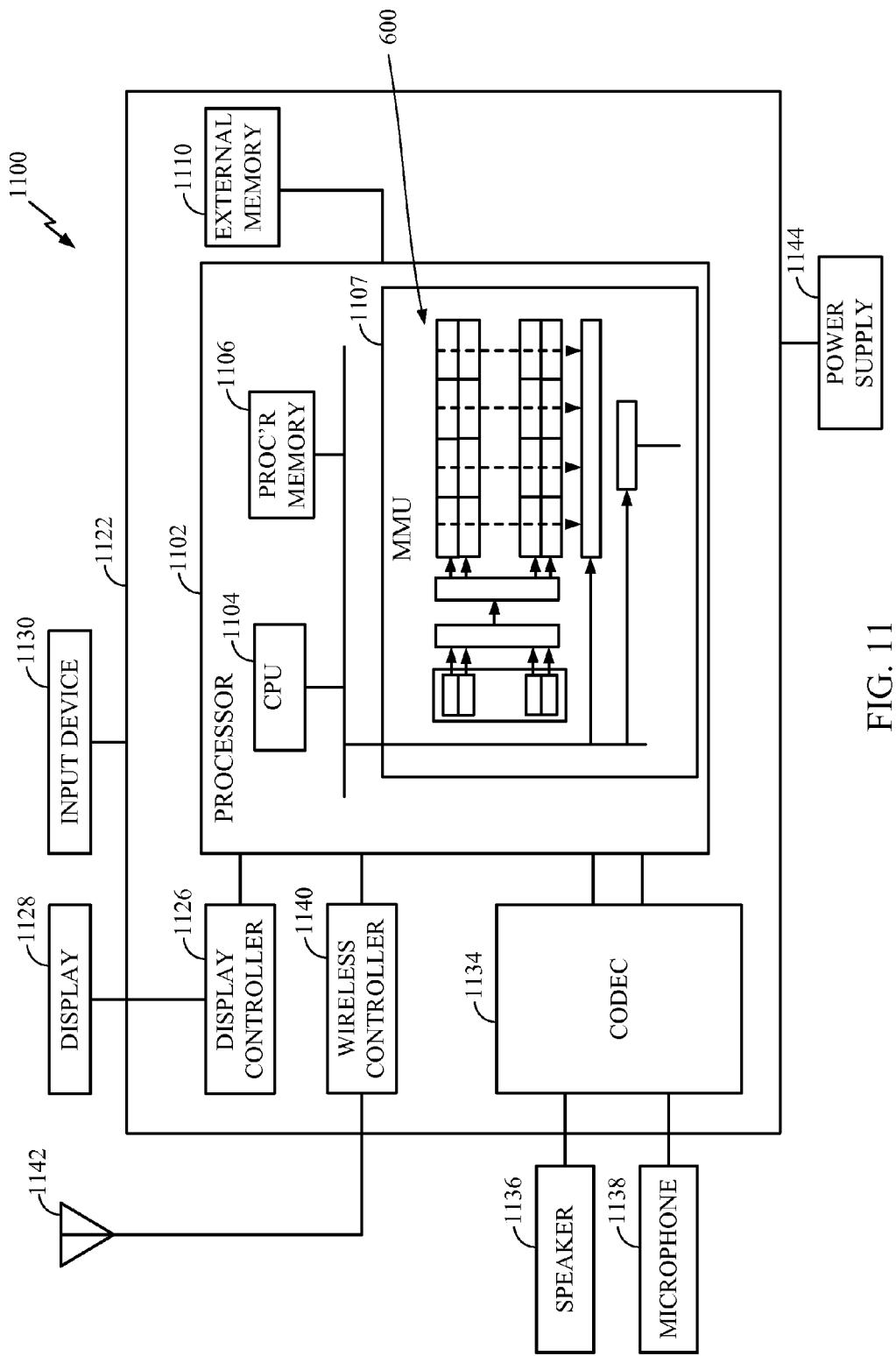
FIG. 11 illustrates an exemplary wireless device in which one or more aspects of the disclosure may be advantageously employed.

FIG. 11 illustrates a wireless device 1100 in which one or more aspects of the disclosure may be advantageously employed.

Referring now to FIG. 11, wireless device 1100 includes processor 1102 having a CPU 1104, a processor memory 1106 and memory management unit (MMU) 1107, interconnected by a system bus (visible in FIG. 11, but not separately labeled). The MMU 1107 can include a burst TLB 600 that may be configured as the FIG. 6 burst TLB 600. The CPU 1104 may generate virtual addresses to access the processor memory 1106 or the external memory 1110. The virtual addresses may be communicated, over the system bus, to the MMU 1107. The MMU 1107, in response, will first search the burst TLB 600, for example, as described in reference to FIG. 6.

Wireless device 1100 may be configured to perform the various methods described in reference to FIGS. 9 and 10, and may be further be configured to execute instructions retrieved from processor memory 1106, or external memory 1110 in order to perform any of the methods described in reference to FIGS. 9 and 10.

FIG. 11 also shows display controller 1126 that is coupled to processor 1102 and to display 1128. Coder/decoder (CO-DEC) 1134 (e.g., an audio and/or voice CODEC) can be coupled to processor 1102. Other components, such as wireless controller 440 (which may include a modem) are also illustrated. For example, speaker 1136 and microphone 1138 can be coupled to CODEC 1134. FIG. 11 also shows that wireless controller 1140 can be coupled to wireless antenna 1142. In a particular aspect, processor 1102, display controller 1126, processor memory 1106, external memory 1110, CODEC 1134, and wireless controller 1140 may be included in a system-in-package or system-on-chip device 1122.

In a particular aspect, input device 1130 and power supply 1144 can be coupled to the system-on-chip device 1122. Moreover, in a particular aspect, as illustrated in FIG. 11, display 1128, input device 1130, speaker 1136, microphone 1138, wireless antenna 1142, and power supply 1144 are external to the system-on-chip device 1122. However, each of display 1128, input device 1130, speaker 1136, microphone 1138, wireless antenna 1142, and power supply 1144 can be coupled to a component of the system-on-chip device 1122, such as an interface or a controller.

It will be understood that the burst TLB 600 is not necessarily part of the processor 1002 and, instead, may be part of an MMU that has a hardware accelerator block (not explipditly visible in FIG. 11), for example, a camera system, video encoder, display controller, issuing memory requests to the MMU which get "translated" by the MMU and redirected to the system memory.

It should also be noted that although FIG. 11 depicts a wireless communications device, processor 1102, and its MMU 1107 with burst TLB 600, may also be integrated into a set-top box, a music player, a video player, an entertainment unit, a navigation device, a personal digital assistant (PDA), a fixed location data unit, a computer, a laptop, a tablet, a mobile phone, or other similar devices.

The foregoing disclosed devices and functionalities may be designed and configured into computer files (e.g., RTL, GDSII, GERBER, etc.) stored on a computer readable medium, or on computer readable media. Some or all such files may be provided to fabrication handlers who fabricate devices based on such files. Resulting products include semiconductor wafers that are then cut into semiconductor die and packaged into a semiconductor chip. The semiconductor chips are then employed in devices described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with aspects disclosed herein may be implemented as electronic hardware, computer software, or combinations of both. Computer software may include a non-transitory computer-readable medium that comprises instructions, that when executed by a processor, can cause the processor to perform steps and related operations in accordance with described aspects. To clearly illustrate interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various methods, sequences and/or algorithms described herein may be implemented, for example, directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative examples and applications of the invention, it should be noted that various changes and modifications may be made herein without departing from the scope of the invention as defined by the appended claims. Functions, steps and/or actions recited in methods claimed need not be performed in any particular order. Further, although features may be described or claimed in the singular, the plural is contemplated unless limitation to the singular is explicitly stated.

What is claimed is:

1. A method for translating a virtual address, comprising receiving a comparand, wherein the comparand includes a virtual address; and
upon determining a match of the comparand to a burst entry tag, selecting a candidate matching translation data unit, the selecting being from a plurality of translation data units, the plurality of translation data units being associated with the burst entry tag, the plurality of translation data units being associated with a corresponding plurality of data validity flags, each one of the plurality of data validity flags for indicating validity of a respective one of the plurality of translation data units, and the selecting being based at least in part on at least one bit of the virtual address, and comparing a content of the candidate matching translation data unit to at least a portion of the comparand and, upon a result of the comparing indicating a match, generating a hit, wherein the burst entry tag comprises a burst entry validity flag based at least in part on a logical OR of the plurality of data validity flags, and wherein determining that the comparand matches the burst entry tag is based, at least in part on the burst entry validity flag.

2. The method of claim 1, further comprising storing a burst entry, the burst entry comprising the burst entry tag and the plurality of translation data units.

3. The method of claim 1, wherein the burst entry tag includes a burst entry address range, and wherein the match of the comparand to the burst entry tag is based, at least in part, on the virtual address being an address within the burst entry address range.

4. The method of claim 3, wherein the method further comprises:

receiving an invalidation comparand; and
based at least in part on a match of the invalidation comparand to the burst entry tag, invalidating the burst entry corresponding to the burst entry tag.

5. The method of claim 3, wherein the burst entry address range is a burst entry primary address range, and wherein the burst entry tag further includes a burst entry secondary address range, and wherein the method further comprises:

receiving an invalidation comparand; and
based at least in part on a match of the invalidation comparand to the burst entry secondary address range, invalidating the translation data units that correspond to the burst entry secondary address range.

6. The method of claim 1, further comprising storing a burst entry, the burst entry comprising the burst entry tag and the plurality of translation data units, wherein the burst entry validity flag is switchable between a burst entry valid flag and a burst entry invalid flag.

7. The method of claim 6, wherein the burst entry tag includes a burst entry address range, and wherein the match of the comparand to the burst entry tag is further based, at least in part, on the virtual address being an address within the burst entry address range.

8. The method of claim 7, wherein the method further comprises:

receiving an invalidation comparand; and
based at least in part on a match of the invalidation comparand to the burst entry tag, switching the burst entry validity flag to the burst entry invalid flag.

9. The method of claim 7, wherein each of the translation data units includes a translation data validity flag, wherein the translation data validity flag is switchable between a translation data valid flag and a translation data invalid flag, and wherein a result of the comparing indicating a match requires that the translation data validity flag of the candidate matching translation data unit is the translation data valid flag.

10. The method of claim 9, wherein the burst entry address range is a burst entry primary address range, and wherein the burst entry tag further includes a burst entry secondary address range, and wherein the method further comprises:

receiving an invalidation comparand; and
based at least in part on a match of the invalidation comparand to the burst entry secondary address range, switching the translation data validity flag of the candidate matching translation data unit to the translation data invalid flag.

11. The method of claim 1, wherein the burst entry is among a plurality of burst entries, each of the burst entries comprising a corresponding burst entry tag and a corresponding plurality of translation data units, wherein the plurality of translation data units of each burst entry includes M translation data units, M being an integer, and
wherein determining whether the comparand matches the burst entry tag comprises determining whether the comparand matches the corresponding burst entry tag of at least one of the burst entries.

12. The method of claim 11, wherein each of the M translation data units holds mapping information for a span of addresses corresponding to a Burst-TLB-granule-size, wherein the Burst-TLB-granule-size is based on the integer M and on an address range corresponding to the burst entry tag, wherein determining whether the comparand matches the burst entry tag comprises determining whether the comparand matches the corresponding burst entry tag of at least one of the burst entries,
the method further comprising:
upon determining that none of the burst entry tags matches the comparand, detecting a miss;
upon detecting the miss, generating an updated burst entry, the updated burst entry including address translation for an address range that includes the comparand, generating the updated burst entry comprising:
receiving a page of Stage-1 mapping information, the page of Stage-1 mapping information having a Stage-1 page size,
receiving a page of Stage-2 mapping information, the page of Stage-2 mapping information having a Stage-2 page size,
determining an effective page size, the effective page size being a minimum from among the Stage-1 page size and the Stage-2 page size,
setting a translation size, as translation size=max(Effective Page size,$2^Q$×Burst-TLB-granule-size), where Q=Log base 2 of M, and
generating the updated burst entry based on the translation size and on mapping information from the page of Stage-1 mapping information and the page of Stage-2 mapping information; and
storing the updated burst entry as one of the plurality of burst entries.

13. The method of claim 12, further comprising, in association with determining an effective page size,
setting an invalidation size, as invalidation size=max(Invalidation Page size,$2^Q$×Burst-TLB-granule-size), the Invalidation page size being the Stage-1 page size.

14. The method of claim 13, wherein storing the updated burst entry is based, at least in part, on a relative size of the effective page size and M times the Burst TLB granule size.

15. The method of claim 14, wherein upon the effective page size being greater than $2^Q$ times the burst TLB granule size, storing the updated burst entry comprises setting same translation data in all M of the translation data units.

16. The method of claim 12, wherein generating the updated burst entry comprises discarding mapping information from the page of Stage-1 mapping information, or mapping information from the page of Stage-2 mapping information, or both, that are outside of a block of interest, and the updated burst entry being mapping information from the page of Stage-1 mapping information, or mapping information from the page of Stage-2 mapping information, or both, within the block of interest.

17. The method of claim 1, wherein the virtual address comprises one or more selection bits, wherein selecting the candidate matching translation data unit selects between the plurality of translation data units, based on a state of the selection bits.

18. A translation lookaside buffer (TLB), comprising:
a burst TLB entry selection logic, configured to receive a comparand and, in response, to determine whether the comparand and a burst entry tag are a match, wherein the comparand includes a virtual address;
a column selector logic configured to select, in response to the burst TLB entry selection logic determining that the comparand and the burst entry tag are a match, a candidate matching translation data unit, wherein the candidate matching translation data unit is among a plurality of translation data units associated with the burst entry tag, and is configured to select the candidate matching translation data unit based at least in part on at least one bit of the virtual address, wherein the plurality of translation data units are associated with a corresponding plurality of data validity flags, each one of the plurality of data validity flags configured to indicate validity of a respective one of the plurality of translation data units; and
match logic, wherein the match logic is configured to compare a content of the candidate matching translation data unit to at least a portion of the comparand and, upon a result of the comparing indicating a match, generate a hit,
wherein the burst entry tag includes a burst entry validity flag generated based at least in part on a logical OR of the plurality of data validity flags, and wherein the burst TLB entry selection logic is further configured to determine that the comparand and the burst entry tag are a match based, at least in part, on the burst entry validity flag.

19. The TLB of claim 18, wherein the virtual address comprises one or more selection bits, wherein the column selector logic is configured to select the candidate matching translation data unit between the plurality of translation data units, based on a state of the selection bits.

20. The TLB of claim 18, wherein the burst entry tag includes a burst entry address range, and wherein the burst TLB entry selection logic is further configured to determine that the comparand and the burst entry tag are a match based, at least in part, on the virtual address being an address within the burst entry address range.

21. The TLB of claim 20, wherein the burst entry address range is a burst entry primary address range, and wherein the burst entry tag further includes a burst entry secondary address range, and wherein the burst TLB entry selection logic is further configured:
to receive an invalidation comparand; and
based at least in part on a match of the invalidation comparand to the burst entry secondary address range, to invalidate the burst entry tag.

22. The TLB of claim 20, wherein the burst entry validity flag is switchable between a burst entry valid flag and a burst entry invalid flag.

23. A non-transitory computer readable medium comprising code, which, when read and executed by a processor, causes the processor to:
receive a comparand, wherein the comparand includes a virtual address; and
determine whether the comparand and a burst entry tag are a match, and upon determining that the comparand and the burst entry tag are a match,
select a candidate matching translation data unit, wherein the candidate matching translation data unit is a translation data unit among a plurality of translation data units associated with the burst entry tag, the plurality of translation data units being associated with a corresponding plurality of data validity flags, each one of the plurality of data validity flags for indicating validity of a respective one of the plurality of translation data units, and to select the candidate matching translation data unit based, at least in part, on at least one bit of the virtual address, and
compare a content of the candidate matching translation data unit to at least a portion of the comparand and, upon a result of the comparing indicating a match, to generate a hit,
wherein the burst entry tag comprises a burst entry validity flag based at least in part on a logical OR of the plurality of data validity flags, and wherein code for determining that the comparand matches the burst entry tag is based, at least in part on the burst entry validity flag.

24. A translation lookaside buffer (TLB), comprising:
means for receiving a comparand, wherein the comparand includes a virtual address; and
means for determining whether the comparand and a burst entry tag are a match, and upon determining that the comparand and the burst entry tag are a match, selecting a candidate matching translation data unit; and
means for comparing a content of the candidate matching translation data unit to at least a portion of the comparand and, upon a result of the comparing indicating a match, for generating a hit,
wherein the candidate matching translation data unit is a translation data unit among a plurality of translation data units, the plurality of translation data units being associated with a corresponding plurality of data validity flags, each one of the plurality of data validity flags for indicating validity of a respective one of the plurality of translation data units, and
wherein selecting the candidate matching translation data unit is based, at least in part, on at least one bit of the virtual address,
wherein the burst entry tag includes a burst entry validity flag based at least in part on a logical OR of the plurality of data validity flags, and means for determining that the comparand and the burst entry tag are a match based, at least in part, on the burst entry validity flag.

25. The TLB of claim 24, wherein the burst entry tag includes a burst entry address range, and wherein the means for determining whether the comparand and the burst entry tag are a match is configured to base the determining, at least in part, on the virtual address being an address within the burst entry address range.

\* \* \* \* \*